U S010634345B2

United States Patent
Taniguchi et al.

(10) Patent No.: US 10,634,345 B2
(45) Date of Patent: Apr. 28, 2020

(54) COMBUSTOR, GAS TURBINE PROVIDED WITH SAME, AND METHOD OF REPAIRING COMBUSTOR (71) Applicant: MITSUBISHI HITACHI POWER SYSTEMS, LTD., Kanagawa (JP)

(72) Inventors: Kenta Taniguchi, Yokohama (JP); Kuniomi Hirano, Yokohama (JP); Shin Kato, Yokohama (JP); Yoshikazu Matsumura, Yokohama (JP); Shingo Sato, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 805 days.

(21) Appl. No.: 15/128,572

(22) PCT Filed: Mar. 20, 2015

(86) PCT No.: PCT/JP2015/058551
§ 371 (c)(1),
(2) Date: Sep. 23, 2016

(87) PCT Pub. No.: WO2015/151880
PCT Pub. Date: Oct. 8, 2015

(65) Prior Publication Data
US 2017/0108216 A1 Apr. 20, 2017

(30) Foreign Application Priority Data
Mar. 31, 2014 (JP) .................................. 2014-073550

(51) Int. Cl.
*F23M 20/00* (2014.01)
*F23R 3/16* (2006.01)
(Continued)

(52) U.S. Cl.
CPC ............ *F23M 20/005* (2015.01); *B23P 6/002* (2013.01); *F23R 3/002* (2013.01); *F23R 3/16* (2013.01);
(Continued)

(58) Field of Classification Search
CPC ......... F23M 20/005; F23R 3/002; F23R 3/04; F23R 3/06; F23R 3/16; F23R 3/42;
(Continued)

(56) References Cited

U.S. PATENT DOCUMENTS

2005/0034918 A1* 2/2005 Bland ................... F23M 20/005
181/250
2006/0021219 A1* 2/2006 Caldwell ................. B23P 6/005
29/889.1

FOREIGN PATENT DOCUMENTS

JP 11-62549 3/1999
JP 2002-174427 6/2002
(Continued)

OTHER PUBLICATIONS

International Search Report dated Jun. 16, 2015 in International Application No. PCT/JP2015/058551 (with English translation).
(Continued)

*Primary Examiner* — Mark A Laurenzi
*Assistant Examiner* — Loren C Edwards
(74) *Attorney, Agent, or Firm* — Wenderoth, Lind & Ponack, L.L.P.

(57) ABSTRACT

A combustor is provided with a combustion liner (12) in which a combustion gas flows through the inner peripheral side and a plurality of through-holes (14) are formed, and a sound attenuator (20) having a space-forming member (21) configured to form a space (S) connected to the plurality of through-holes (14) at the outer peripheral side of the combustion liner (12). A method of repairing a combustor
(Continued)

involves executing: an opening step of opening a portion of the space-forming member (21) in contact with the outside and bringing the outside and the space (S) in communication with each other; a cylinder repair step of repairing the combustion liner (12); a foreign substance removal step of removing foreign substances in the space (S) from the opening (23) opened in the opening step to the outside, after the cylinder repair step; and a closing step of closing the opening (23) using a lid (24), after the foreign substance removal step.

6 Claims, 11 Drawing Sheets

(51) Int. Cl.
    *B23P 6/00*           (2006.01)
    *F23R 3/00*           (2006.01)
    *F23R 3/42*           (2006.01)

(52) U.S. Cl.
    CPC ............ *F23R 3/42* (2013.01); *B23P 2700/13* (2013.01); *F23R 2900/00014* (2013.01); *F23R 2900/00019* (2013.01)

(58) Field of Classification Search
    CPC .. F23R 3/28; F23R 3/283; F23R 3/286; F23R 2900/00014; F23R 2900/00019; B23P 6/002; B23P 2700/13
    USPC .......................................................... 60/725
    See application file for complete search history.

(56) References Cited

FOREIGN PATENT DOCUMENTS

| | | |
|---|---|---|
| JP | 2002-317933 | 10/2002 |
| JP | 2005-315473 | 11/2005 |
| JP | 2006-22966 | 1/2006 |
| JP | 2006-97981 | 4/2006 |
| JP | 2007-132640 | 5/2007 |
| JP | 2012-73271 | 4/2012 |
| JP | 2013-117231 | 6/2013 |

OTHER PUBLICATIONS

Written Opinion of the International Searching Authority dated Jun. 16, 2015 in International Application No. PCT/JP2015/058551 (with English translation).

\* cited by examiner

COMBUSTOR, GAS TURBINE PROVIDED WITH SAME, AND METHOD OF REPAIRING COMBUSTOR

TECHNICAL FIELD

The present invention relates to a combustor having a sound attenuator installed at an outer peripheral side of a cylinder in which a combustion gas flows through an inner peripheral side thereof, a gas turbine including the same, and a method of repairing a combustor. Priority is claimed on Japanese Patent Application No. 2014-073550, filed Mar. 31, 2014, the content of which is incorporated herein by reference.

BACKGROUND ART

A gas turbine includes a compressor configured to compress air, a combustor configured to combust fuel in the air compressed by the compressor to generate a combustion gas, and a turbine configured to be driven by the combustion gas from the combustor.

For example, as disclosed in the following Patent Literature 1, the combustor of the gas turbine has a combustion liner (or a transition piece) in which a fuel is combusted, an injector configured to inject the fuel and air into the combustion liner, and a sound attenuator such as a sound damper installed at an outer peripheral side of the combustion liner. A large number of small through-holes passing from the inner peripheral side to the outer peripheral side are formed in the combustion liner. The sound attenuator has a cover configured to cover a portion of the outer periphery of the combustion liner in which the large number of through-holes are formed, and plates configured to partition a space between the combustion liner and the cover into a plurality of spaces.

In the combustion liner, the fuel is combusted at the inner peripheral side, and the combustion gas having a high temperature generated by the combustion flows therein. For this reason, the combustion liner is formed of a metal plate having a high thermal resistance. Further, a thermal barrier coating is applied to a surface of the metal plate.

CITATION LIST

Patent Literature

[Patent Literature 1]
Japanese Unexamined Patent Application, First Publication No. 2013-117231

SUMMARY OF INVENTION

Technical Problem

When the combustor disclosed in Patent Literature 1 is repaired, it is often the case that, after the thermal barrier coating that has deteriorated or been damaged due to heat is delaminated, the thermal barrier coating is applied to the inner peripheral side of the combustion liner again. In the process of delaminating the thermal barrier coating, particles of metal, ceramics, or the like that form the thermal barrier coating enter the cover via the large number of through-holes of the combustion liner. In addition, even in the process of applying the thermal barrier coating, the particles of the metal, ceramics, or the like that form the thermal barrier coating enter the cover via the large number of through-holes of the combustion liner. Further, even in an operation of the combustor, various kinds of foreign substances enter the cover via the large number of through-holes of the combustion liner.

The various kinds of foreign substances that have entered the cover as described above are preferably removed in a process of repairing the combustor. However, removal of the foreign substances that have entered the cover via the large number of small through-holes formed in the combustion liner is extremely difficult. For this reason, development of a method of easily removing foreign substances from the inside of the cover in the process of repairing the combustor is required.

Here, the present invention is directed to providing a combustor that allows easy removal of foreign substances from the inside of the sound attenuator, a gas turbine including the same, and a method of repairing a combustor.

Solution to Problem

In order to achieve the aforementioned objects, there is provided a method of repairing a combustor according to an aspect of the present invention, the combustor including a cylinder in which a combustion gas flows through an inner peripheral side and a plurality of holes are formed so as to pass from the inner peripheral side to an outer peripheral side, and a sound attenuator having a space-forming member configured to form a space connected to the plurality of holes at the outer peripheral side of the cylinder, the method of repairing the combustor including: an opening step of opening a portion of the space-forming member in contact with an outside and bringing the outside and the space in communication with each other; a cylinder repair step of repairing the cylinder; a foreign substance removal step of removing foreign substances in the space from the opening opened in the opening step to the outside, after the cylinder repair step; and a closing step of closing the opening using a lid, after the foreign substance removal step.

In the repair method, since the portion of the space-forming member in contact with the outside is opened, the foreign substances in the space can be easily removed from the opening to the outside.

Here, in the method of repairing the combustor, in the opening step, the portion of the space-forming member in contact with the outside may be opened so as to have an opening area larger than an opening area of each of the plurality of holes.

In addition, in the method of repairing the combustor of any one of the above-described aspects, the space-forming member may have a pair of first plates opposite to each other at an interval, and a second plate configured to connect ends of the pair of first plates to each other, and in the opening step, the second plate may be opened from one first plate of the pair of first plates to the other first plate.

In addition, in the method of repairing the combustor of any one of the above-described aspects, the sound attenuator may have a porous body disposed in the space, and the method of repairing the combustor may include: a porous body extraction step of extracting the porous body in the space from the opening opened in the opening step to the outside, before the cylinder repair step; and a porous body disposition step of inserting the porous body into the space from the opening before the opening is closed in the closing step, after the foreign substance removal step.

In the repair method, since the porous body in the space is extracted from the opening to the outside before the cylinder repair step, the foreign substances such as metal powder generated in a process of executing the cylinder repair step can be prevented from being attached to the porous body. In addition, as the porous body is extracted from the space, movement of the foreign substances in the space becomes easy, and the foreign substances in the space can be more easily removed to the outside.

In addition, in the method of repairing the combustor of any one of the above-described aspects, the space-forming member may have a main body having an opening configured to bring the outside and the space in communication with each other, and a lid joined to the main body and configured to close the opening, and in the opening step, the main body and the lid may be separated from each other.

In the repair method, since the opening formed in the main body is opened when the main body and the lid of the space-forming member are separated from each other, the opening can be easily formed in the space-forming member.

In addition, in the method of repairing the combustor of any one of the above-described aspects, the space-forming member may have a main body having an opening configured to bring the outside and the space in communication with each other, and a lid joined to the main body and configured to close the opening; the sound attenuator may have a porous body disposed in the space and joined to the lid; in the opening step, the main body and the lid may be separated from each other, the lid may be distanced from the main body, and the porous body in the space may be extracted from the opening to the outside; and in the closing step, as the opening is closed by the lid, the porous body joined to the lid may be disposed in the space.

In the repair method, since the porous body in the space is extracted from the opening to the outside before the cylinder repair step, the foreign substances such as metal powder generated in the process of executing the cylinder repair step can be prevented from being attached to the porous body. In addition, as the porous body is extracted from the space, movement of the foreign substances in the space becomes easy, and the foreign substances in the space can be more easily removed to the outside. Moreover, in the repair method, since the porous body is joined to the lid, in the opening step, when the main body and the lid are separated from each other, the porous body in the space can be easily extracted from the opening to the outside. In addition, in the repair method, since the porous body joined to the lid is disposed in the space as the opening is closed by the lid, the porous body can be easily disposed in the space.

In order to accomplish the aforementioned objects, according to an aspect of the present invention, there is provided a combustor including: a cylinder in which a combustion gas flows through an inner peripheral side and a plurality of holes are formed so as to pass from the inner peripheral side to an outer peripheral side; and a sound attenuator having a space-forming member configured to form a space connected to the holes at the outer peripheral side of the cylinder, wherein the space-forming member has a main body having an opening configured to bring an outside and the space in communication with each other, and a lid joined to the main body and configured to close the opening.

In the combustor, since the opening formed in the main body is opened when the main body and the lid of the space-forming member are separated from each other, the opening can be easily formed in the space-forming member. Further, the foreign substances in the space can be easily removed from the opening to the outside.

In addition, in the combustor, an area of the opening may be larger than an opening area of each of the plurality of holes.

In addition, in the combustor of any one of the above-described aspects, the space-forming member may have a pair of first plates that are opposite to each other at an interval, and a second plate having the opening and configured to connect ends of the pair of first plates to each other, and the opening formed in the second plate may be opened from one first plate of the pair of first plates to the other first plate.

In addition, in the combustor of any one of the above-described aspects, the sound attenuator may have a porous body disposed in the space.

In addition, in the combustor having the porous body, the porous body may be joined to the lid.

In the combustor, as the lid is separated from the main body of the space-forming member, the porous body in the space can be easily extracted from the opening to the outside. In addition, in the combustor, since the porous body joined to the lid is disposed in the space as the opening is closed by the lid, the porous body can be easily disposed in the space.

In addition, in the combustor of any one of the above-described aspects, the sound attenuator may have a porous body disposed in the space; the space-forming member may have a pair of first plates that are opposite to each other at an interval, and a second plate having the opening and configured to connect ends of the pair of first plates to each other; the opening formed in the second plate may be opened from one first plate of the pair of first plates to the other first plate; and the porous body may come in contact with the one first plate and the other first plate of the pair of first plates and may be joined to the lid.

In order to accomplish the aforementioned objects, according to an aspect of the present invention, there is provided a gas turbine including: the combustor according to any one of the above-described aspects; and a turbine driven by the combustion gas from the combustor.

Advantageous Effects of Invention

According to an aspect of the present invention, foreign substances can be easily removed from the inside of the sound attenuator of the combustor.

DESCRIPTION OF EMBODIMENTS

Hereinafter, embodiments of a combustor according to the present invention, a gas turbine including the same, and a method of repairing a combustor will be described in detail with reference to the accompanying drawings.

Figure 1:
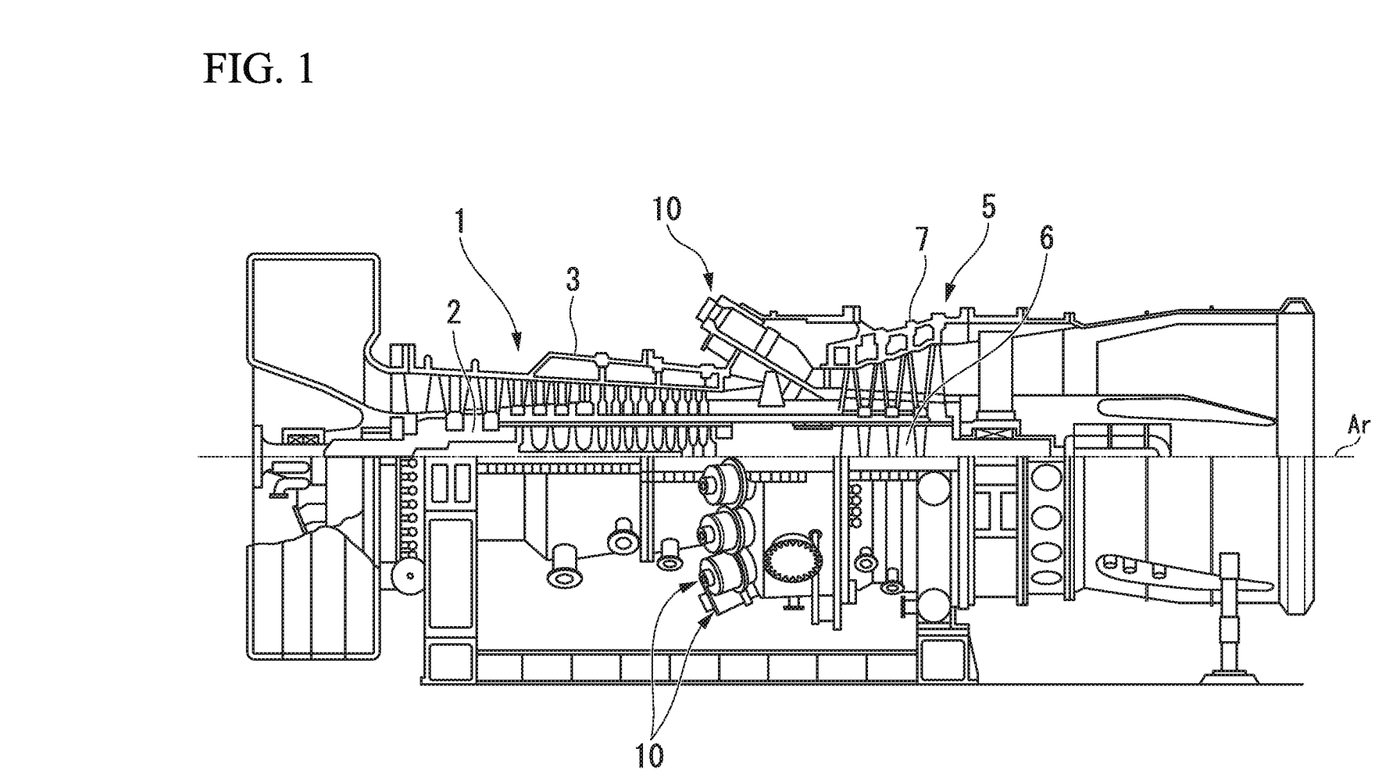
FIG. 1 is a cutout side view of a major part of a gas turbine according to an embodiment of the present invention.

As shown in FIG. 1, a gas turbine of the embodiment includes a compressor 1 configured to compress air, a plurality of combustors 10 configured to combust fuel in the air from the compressor 1 to generate a combustion gas, and a turbine 5 driven by the combustion gas.

The compressor 1 has a compressor rotor 2 configured to rotate about an axis of rotation Ar, and a compressor casing 3 configured to rotatably cover the compressor rotor 2. The turbine 5 includes a turbine rotor 6 configured to rotate about the axis of rotation Ar, and a turbine casing 7 configured to rotatably cover the turbine rotor 6. The compressor rotor 2 and the turbine rotor 6 are connected to each other to be integrally rotated, and form a gas turbine rotor. The combustor 10 is fixed to the turbine casing 7.

Figure 2:
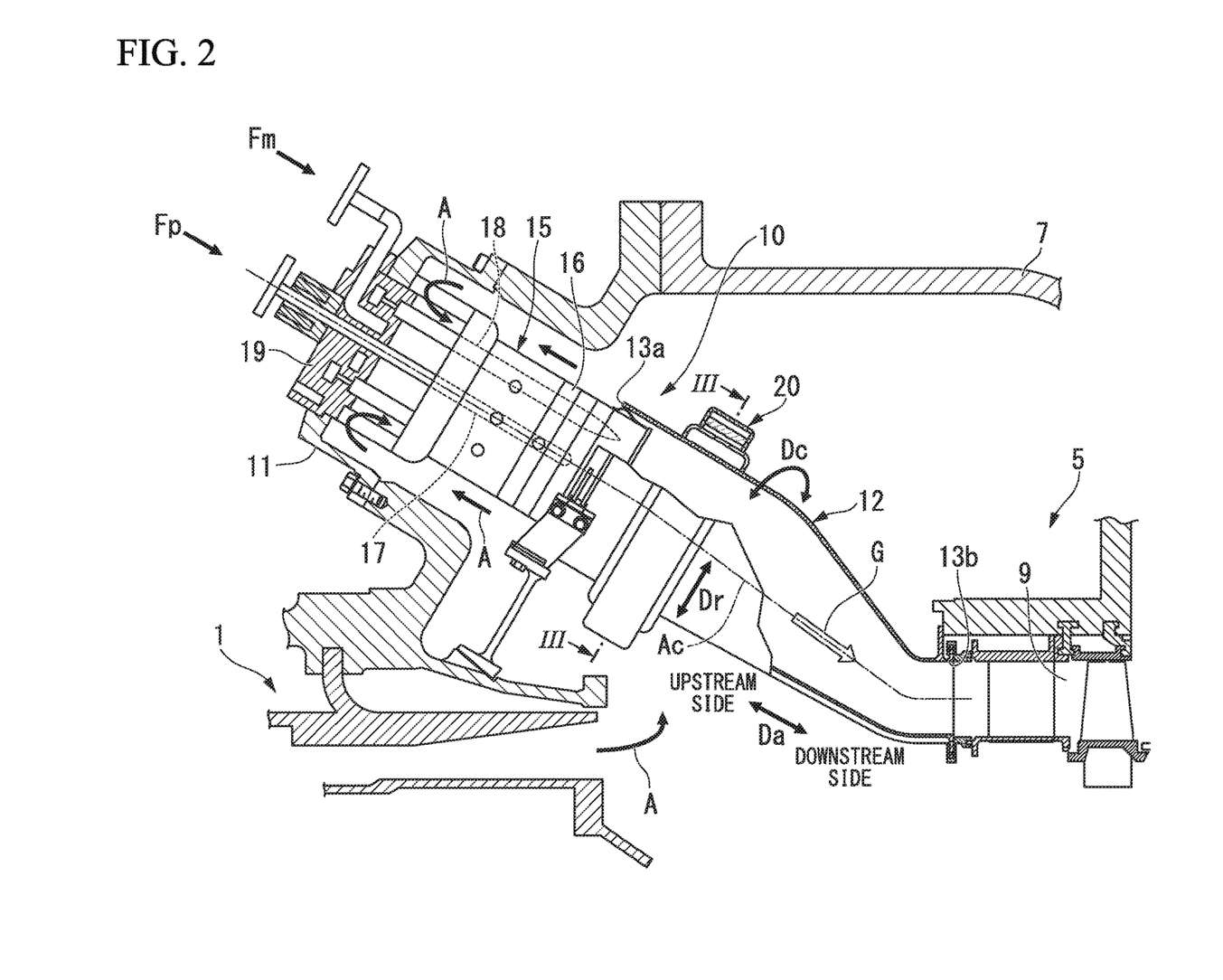
FIG. 2 is a general side view of a combustor according to the embodiment of the present invention, a major part of which is cut out.

As shown in FIG. 2, the combustor 10 includes an external cylinder 11 fixed to the turbine casing 7, a combustion liner (or a transition piece) 12 disposed inside the turbine casing 7 and configured to send a combustion gas G having a high temperature and a high pressure to a gas flow path 9 of the turbine 5, a fuel supply device 15 configured to supply fuel and air into the combustion liner 12, and a sound attenuator 20 installed at an outer peripheral side of the combustion liner 12.

The fuel supply device 15 has a combustor basket 16, a pilot nozzle 17 disposed on a central axis of the combustor basket 16, a plurality of main nozzles 18 disposed around the pilot nozzle 17 at equal intervals in a circumferential direction, and a nozzle mount 19 to which the pilot nozzle 17 and the plurality of main nozzles 18 are attached.

The combustion liner 12 is a cylindrical member, both ends of which are open. A portion of the combustor basket 16 is inserted inside one opening 13a of the combustion liner 12. In addition, the other opening 13b of the combustion liner 12 is connected to the gas flow path 9 of the turbine 5.

The combustion liner 12 has a base member obtained by forming a plate member in a cylindrical shape. A thermal barrier coating is applied to an inner peripheral surface of the cylindrical base member. The base member is formed of, for example, a Ni-based alloy, a Co-based alloy, or the like, having a high thermal resistance. The thermal barrier coating is formed on an inner peripheral surface of the cylindrical base member by spraying, for example, a metal powder or ceramic powder having a high thermal resistance.

Here, the side of the one opening 13a of the openings 13a and 13b at both ends of the combustion liner 12 is referred to as an upstream side, and the side of the other opening 13b is referred to as a downstream side. In addition, an imaginary line that connects the center of gravity of the opening surface at the upstream side of the combustion liner 12 and the center of gravity of the opening surface at the downstream side of the combustion liner 12 is referred to as an axis Ac, a direction in which the axis Ac extends is referred to as an axial direction (or an upstream/downstream direction) Da, a circumferential direction with reference to the axis Ac is simply referred to as a circumferential direction Dc, and a radial direction with reference to the axis Ac is simply referred to as a radial direction Dr.

The nozzle mount 19 is fixed to the furthest upstream position of the external cylinder 11. A base end portion at the upstream side of each of the nozzles 17 and 18 is fixed to the nozzle mount 19. The pilot nozzle 17 sprays a pilot fuel Fp downstream from a distal end portion which is a portion at the downstream side. The pilot fuel Fp forms a diffusion flame by combustion. In addition, the plurality of main nozzles 18 spray a main fuel Fm. The main fuel Fm is mixed with air A flowing downstream around the main nozzle 18 and becomes a part of the premixed gas. The main fuel Fm in the premixed gas forms a premixed flame by combustion.

As shown in FIGS. 4 and 6 to 8, a large number of small through-holes 14 passing from the inner peripheral side to the outer peripheral side are formed in the combustion liner 12. As shown in FIGS. 3, 4 and 6 to 8, the sound attenuator 20 has a space-forming member 21 that forms a space S connected to the large number of through-holes 14 at the outer peripheral side of the combustion liner 12, and a porous body 25 disposed in the space S.

The space-forming member 21 has a main body 22 having a discharge opening 23 configured to bring the outside in communication with the space S, and a lid 24 configured to close the discharge opening 23. The porous body 25 is formed of, for example, a foamed metal. The porous body 25 is joined to the lid 24 by, for example, brazing. A small drain hole (not shown) configured to bring the internal space S in communication with the outside is formed in the main body 22. The drain hole is formed to discharge drain formed by condensation of the combustion gas flowing into the internal space S via the through-hole 14 of the combustion liner 12 to the outside. The main body 22 has a first space-forming member 31 that forms a first space S1 along the outer periphery of the combustion liner 12 in cooperation with the combustion liner 12, a second space-forming member 32 that forms a second space S2 at the outer peripheral side of the first space S1 in cooperation with the first space-forming member 31, a third space-forming member 33 that forms a third space S3 at the outer peripheral side of the second space S2 in cooperation with the second space-forming member 32, and a fourth space-forming member 34 that forms a fourth space S4 at the outer peripheral side of the third space S3 in cooperation with the third space-forming member 33.

Figure 3:
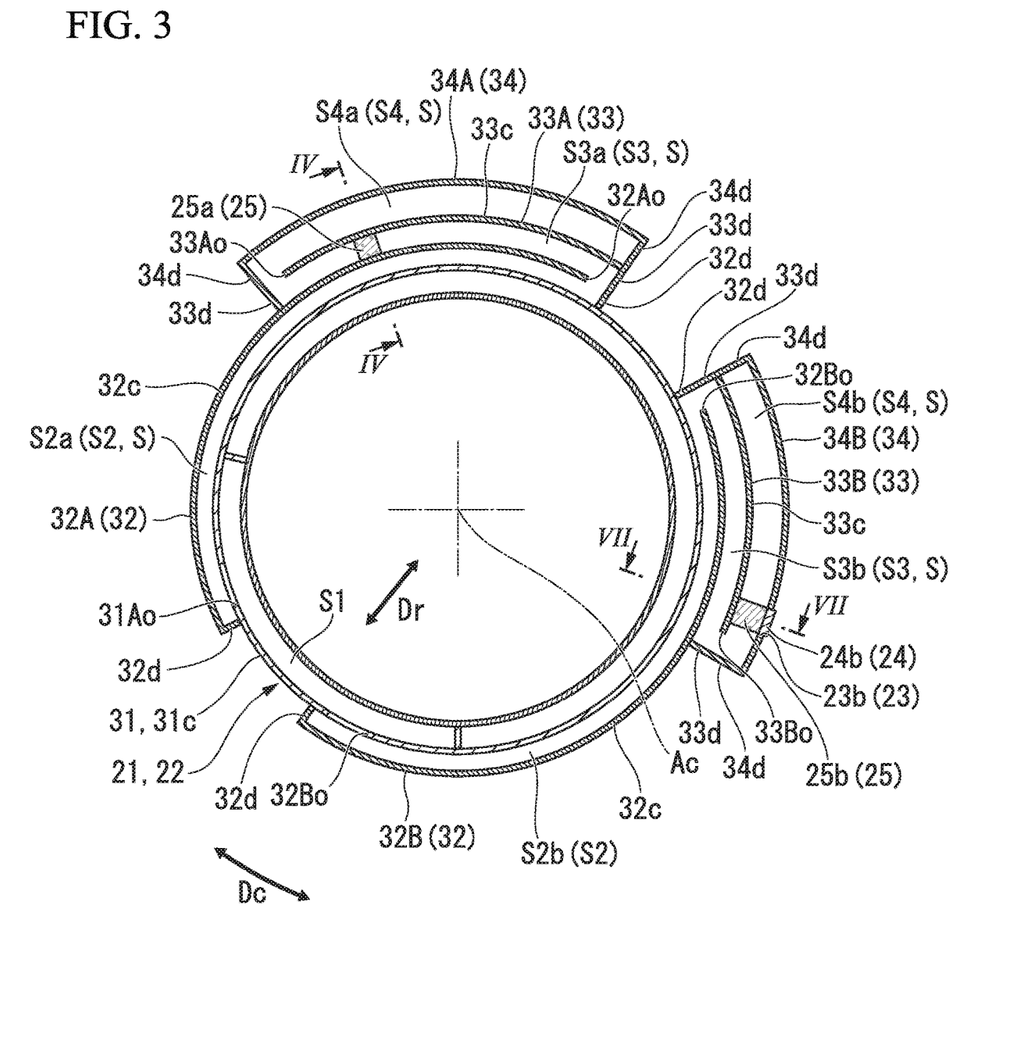
FIG. 3 is a cross-sectional view taken along line of FIG. 2.
Figure 4:
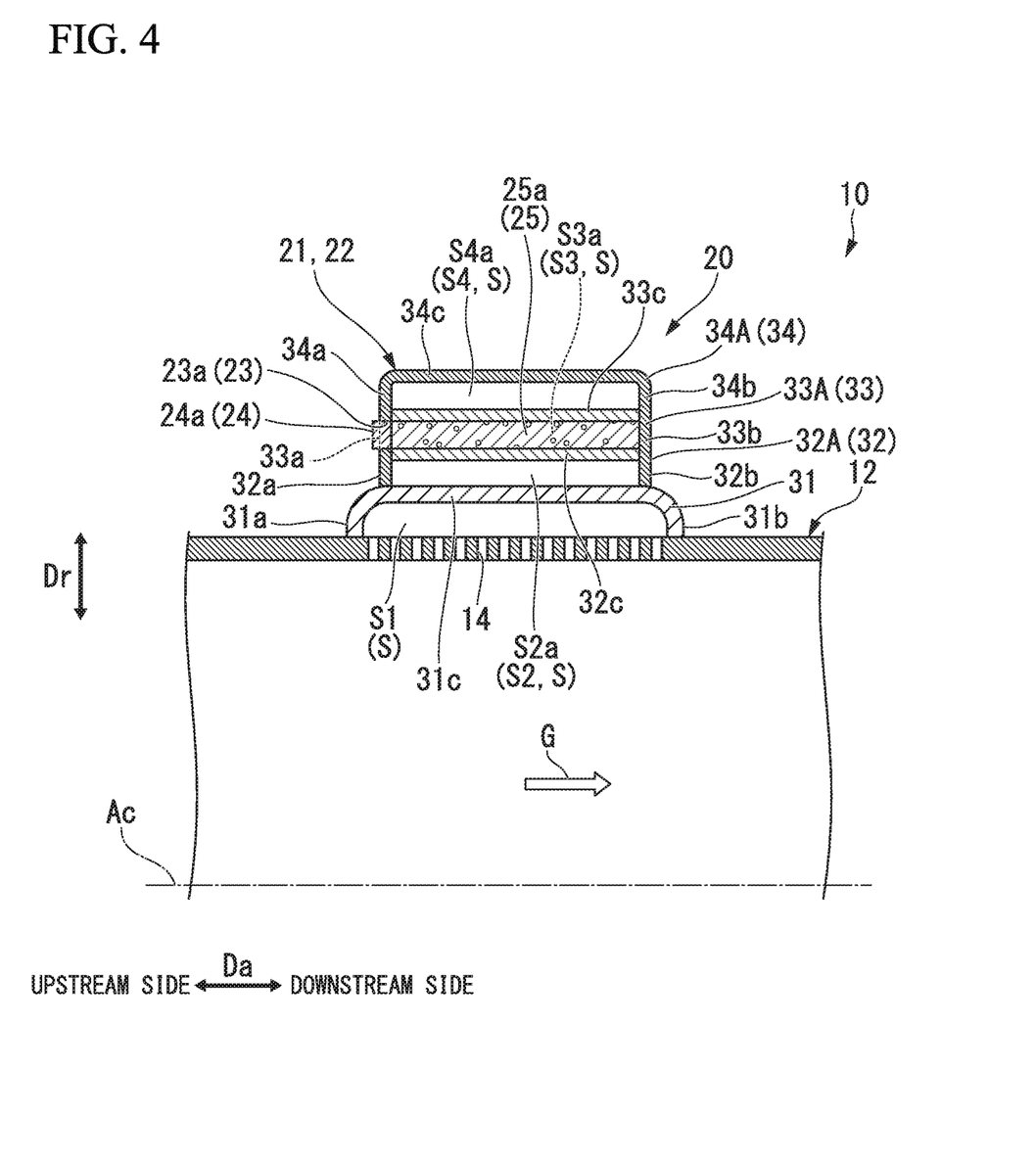
FIG. 4 is a cross-sectional view taken along line IV-IV of FIG. 3.
Figure 6:
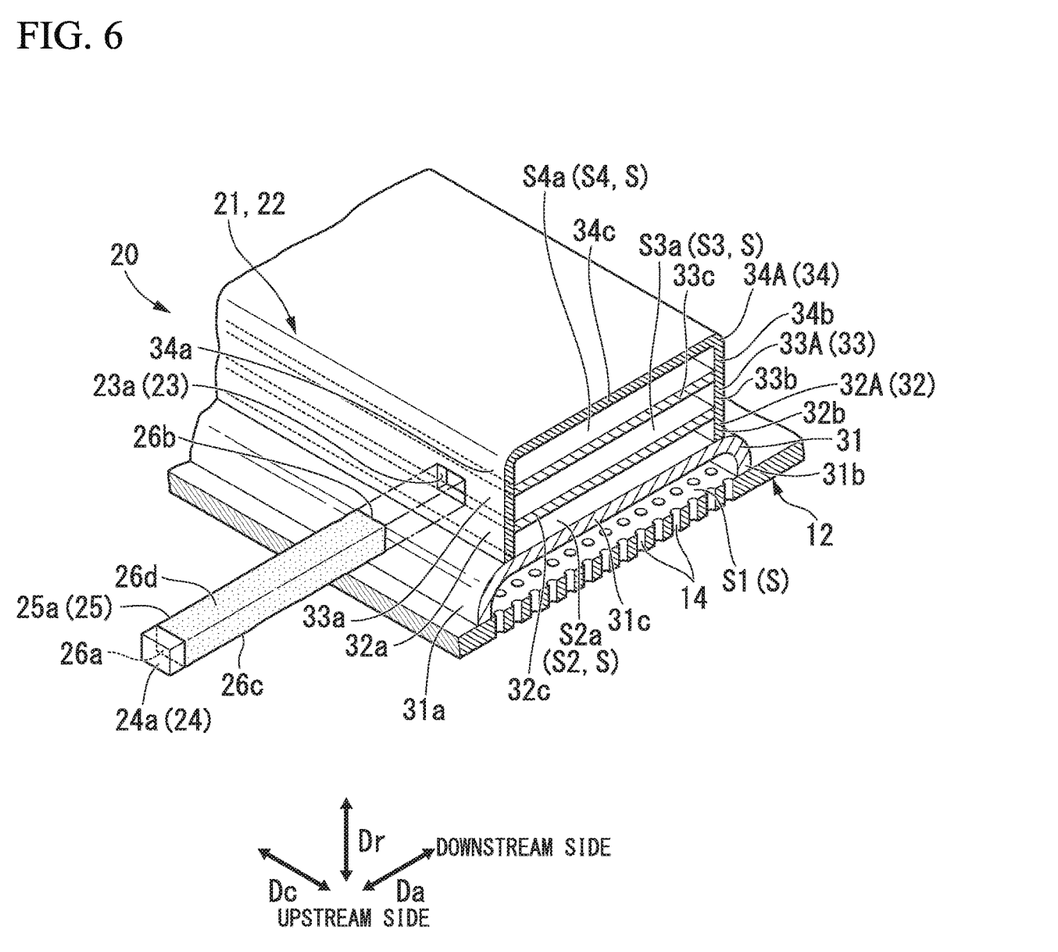
FIG. 6 is a cutout perspective view (the 1st) of a major part of a sound attenuator according to the embodiment of the present invention.

The first space S1 is formed along the entire outer periphery of a portion in the axial direction Da of the combustion liner 12 by the first space-forming member 31. As shown in FIGS. 3, 4 and 6, the first space-forming member 31 has an upstream side plate 31a and a downstream side plate 31b that are opposite to each other in the axial direction Da, and a cylinder-opposing plate 31c opposite to the combustion liner 12 and configured to connect an outside end in the radial direction of the upstream side plate 31a and an outside end in the radial direction of the downstream side plate 31b. Two first openings 31Ao and 31Bo (see FIG. 3) passing from the inner peripheral side to the outer peripheral side are formed in the cylinder-opposing plate 31c of the first space-forming member 31. The first space-forming member 31 is joined to the outer peripheral surface of the combustion liner 12 by, for example, brazing or the like. Alternatively, joining of the first space-forming member 31 to the combustion liner 12 may be by welding or the like.

Figure 7:
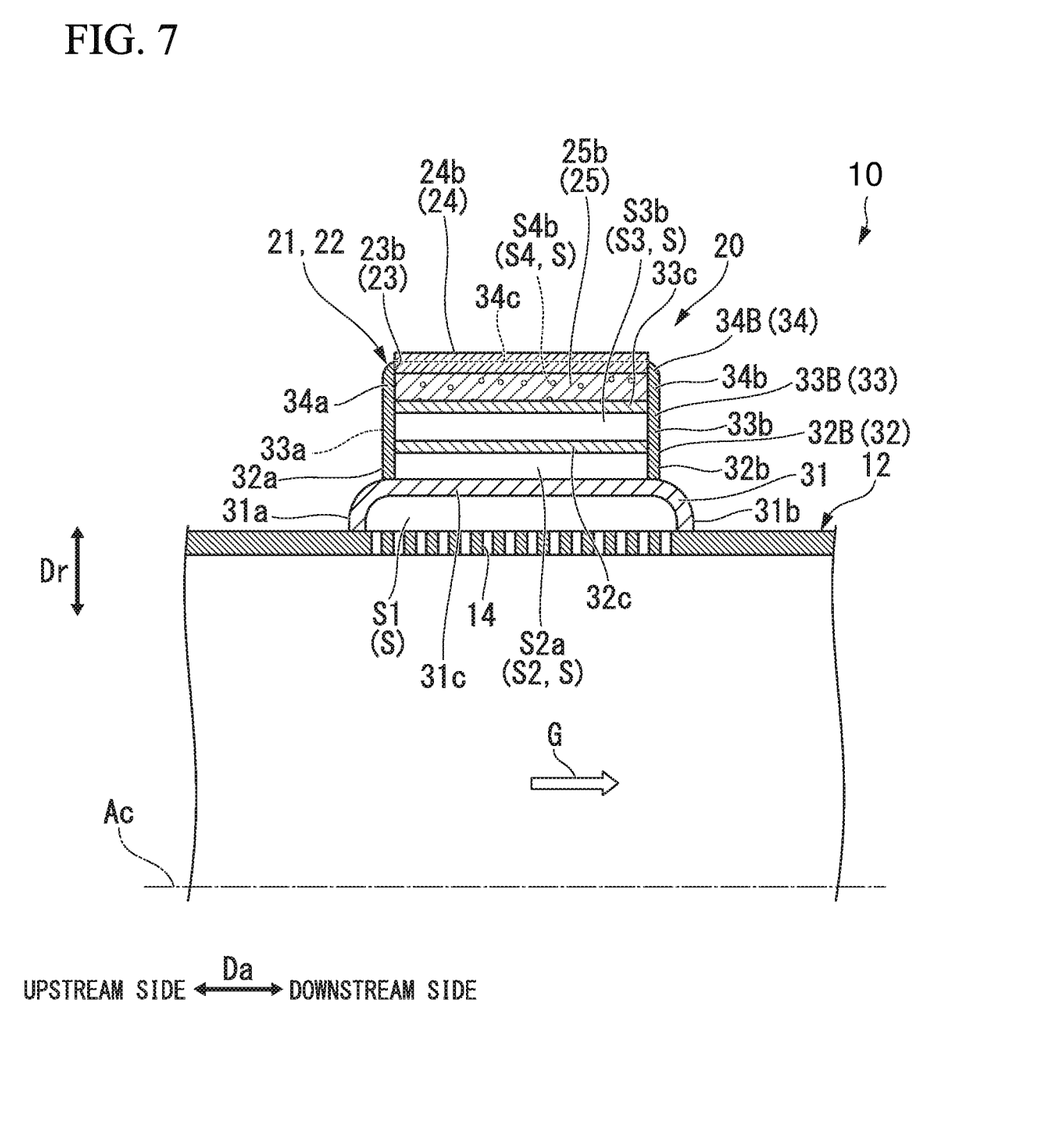
FIG. 7 is a cross-sectional view taken along line VII-VII of FIG. 3.
Figure 8:
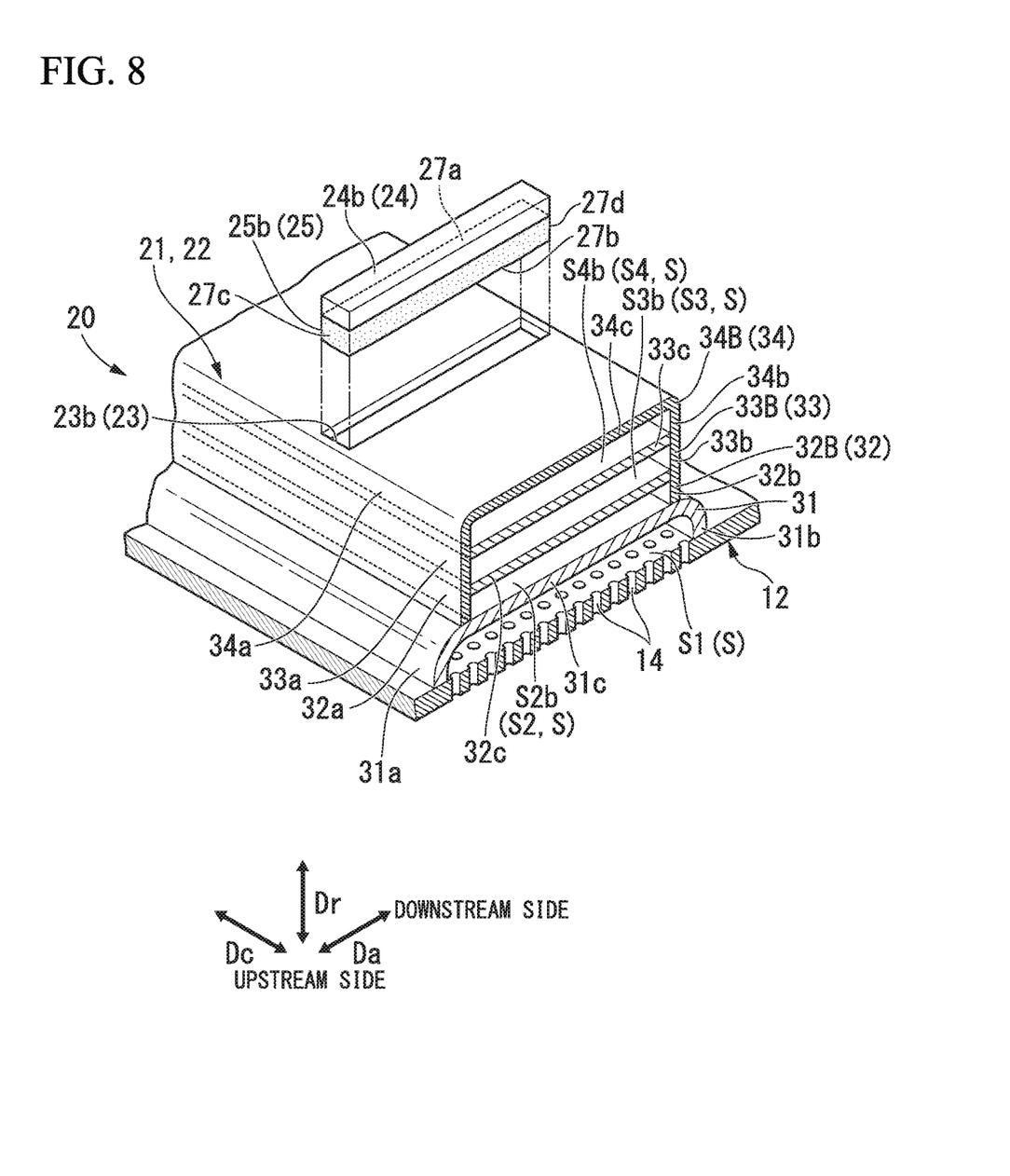
FIG. 8 is a cutout perspective view (the 2nd) of the major part of the sound attenuator according to the embodiment of the present invention.

The second space S2 is constituted by a second A space S2a in communication with the first space S1 via one first A opening 31Ao of the two first openings 31Ao and 31Bo (see FIG. 3) formed in the cylinder-opposing plate 31c of the first space-forming member 31, and a second B space S2b in communication with the first space S1 via the other first B opening 31Bo of the two first openings 31Ao and 31Bo. The second A space S2a expands from the first A opening 31Ao toward one side in the circumferential direction Dc and the second B space S2b expands from the first B opening 31Bo toward the other side in the circumferential direction Dc. As shown in FIGS. 4 and 6, the second A space S2a is constituted by a second A space-forming member 32A and the cylinder-opposing plate 31c of the first space-forming member 31. In addition, as shown in FIGS. 7 and 8, the second B space S2b is constituted by a second B space-forming member 32B and the cylinder-opposing plate 31c of the first space-forming member 31.

The above-mentioned second space-forming member 32 has the second A space-forming member 32A and the second B space-forming member 32B. Each of the second A space-forming member 32A and the second B space-forming member 32B has an upstream side plate 32a and a downstream side plate 32b that are opposite to each other in the axial direction Da, and a cylinder-opposing plate 32c opposite to the combustion liner 12 and configured to connect an outside end in the radial direction of the upstream side plate 32a and an outside end in the radial direction of the downstream side plate 32b. Further, each of the second A space-forming member 32A and the second B space-forming member 32B has peripheral end plates 32d (see FIG. 3) disposed at both ends in the circumferential direction Dc of the upstream side plate 32a and the downstream side plate 32b and configured to connect ends in the circumferential direction Dc of the upstream side plate 32a and the downstream side plate 32b. A second A opening 32Ao (see FIG. 3) passing from the inner peripheral side to the outer peripheral side is formed in the cylinder-opposing plate 32c of the second A space-forming member 32A at a position farthest from the first A opening 31Ao in the circumferential direction Dc. In addition, a second B opening 32Bo (see FIG. 3) passing from the inner peripheral side to the outer peripheral side is formed in the cylinder-opposing plate 32c of the second B space-forming member 32B at a position farthest from the first B opening 31Bo in the circumferential direction Dc.

The third space S3 is constituted by a third A space S3a in communication with the second A space S2a via the second A opening 32Ao, and a third B space S3b in communication with the second B space S2b via the second B opening 32Bo. The third B space S3b expands from the second B opening 32Bo toward one side in the circumferential direction Dc and the third A space S3a expands from the second A opening 32Ao toward the other side in the circumferential direction Dc. The third A space S3a is formed by a third A space-forming member 33A and the cylinder-opposing plate 32c of the second A space-forming member 32A. The third B space S3b is formed by a third B space-forming member 33B and the cylinder-opposing plate 32c of the second B space-forming member 32B.

The above-mentioned third space-forming member 33 has the third A space-forming member 33A and the third B space-forming member 33B. Each of the third A space-forming member 33A and the third B space-forming member 33B has an upstream side plate 33a and a downstream side plate 33b that are opposite to each other in the axial direction Da, and a cylinder-opposing plate 33c opposite to the combustion liner 12 and configured to connect an outside end in the radial direction of the upstream side plate 33a and an outside end in the radial direction of the downstream side plate 33b. Further, each of the third A space-forming member 33A and the third B space-forming member 33B has peripheral end plates 33d (see FIG. 3) disposed at both ends in the circumferential direction Dc of the upstream side plate 33a and the downstream side plate 33b and configured to connect ends in the circumferential direction Dc of the upstream side plate 33a and the downstream side plate 33b to each other. A third A opening 33Ao (see FIG. 3) passing from the inner peripheral side to the outer peripheral side is formed in the cylinder-opposing plate 33c of the third A space-forming member 33A at a position farthest from the second A opening 32Ao in the circumferential direction Dc. In addition, a third B opening 33Bo (see FIG. 3) passing from the inner peripheral side to the outer peripheral side is formed in the cylinder-opposing plate 33c of the third B space-forming member 33B at a position farthest from the second B opening 32Bo in the circumferential direction Dc.

The fourth space S4 is constituted by a fourth A space S4a in communication with the third A space S3a via the third A opening 33Ao, and a fourth B space S4b in communication with the third B space S3b via the third B opening 33Bo. The fourth A space S4a expands from the third A opening 33Ao toward one side in the circumferential direction Dc and the fourth B space S4b expands from the third B opening 33Bo toward the other side in the circumferential direction Dc. The fourth A space S4a is formed by a fourth A space-forming member 34A and the cylinder-opposing plate 33c of the third A space-forming member 33A. The fourth B space S4b is formed by a fourth B space-forming member 34B and the cylinder-opposing plate 33c of the third B space-forming member 33B.

The above-mentioned fourth space-forming member 34 has the fourth A space-forming member 34A and the fourth B space-forming member 34B. Each of the fourth A space-forming member 34A and the fourth B space-forming member 34B has an upstream side plate 34a and a downstream side plate 34b that are opposite to each other in the axial direction Da, and a cylinder-opposing plate 34c opposite to the combustion liner 12 and configured to connect an outside end in the radial direction of the upstream side plate 34a and an outside end in the radial direction of the downstream side plate 34b. Further, each of the fourth A space-forming member 34A and the fourth B space-forming member 34B has peripheral end plates 34d disposed at both ends in the circumferential direction Dc of the upstream side plate 34a, the downstream side plate 34b and the cylinder-opposing plate 34c and configured to connect ends in the circumferential direction Dc of the upstream side plate 34a, the downstream side plate 34b and the cylinder-opposing plate 34c to each other.

As shown in FIG. 3, the porous body 25 is constituted by an A porous body 25a disposed in the third A space S3a and a B porous body 25b disposed in the fourth B space S4b. The A porous body 25a is disposed in the third A space S3a such that the third A space S3a is partitioned in the circumferential direction Dc. In addition, the B porous body 25b is disposed in the fourth B space S4b such that the fourth B space S4b is partitioned in the circumferential direction Dc.

Figure 5:
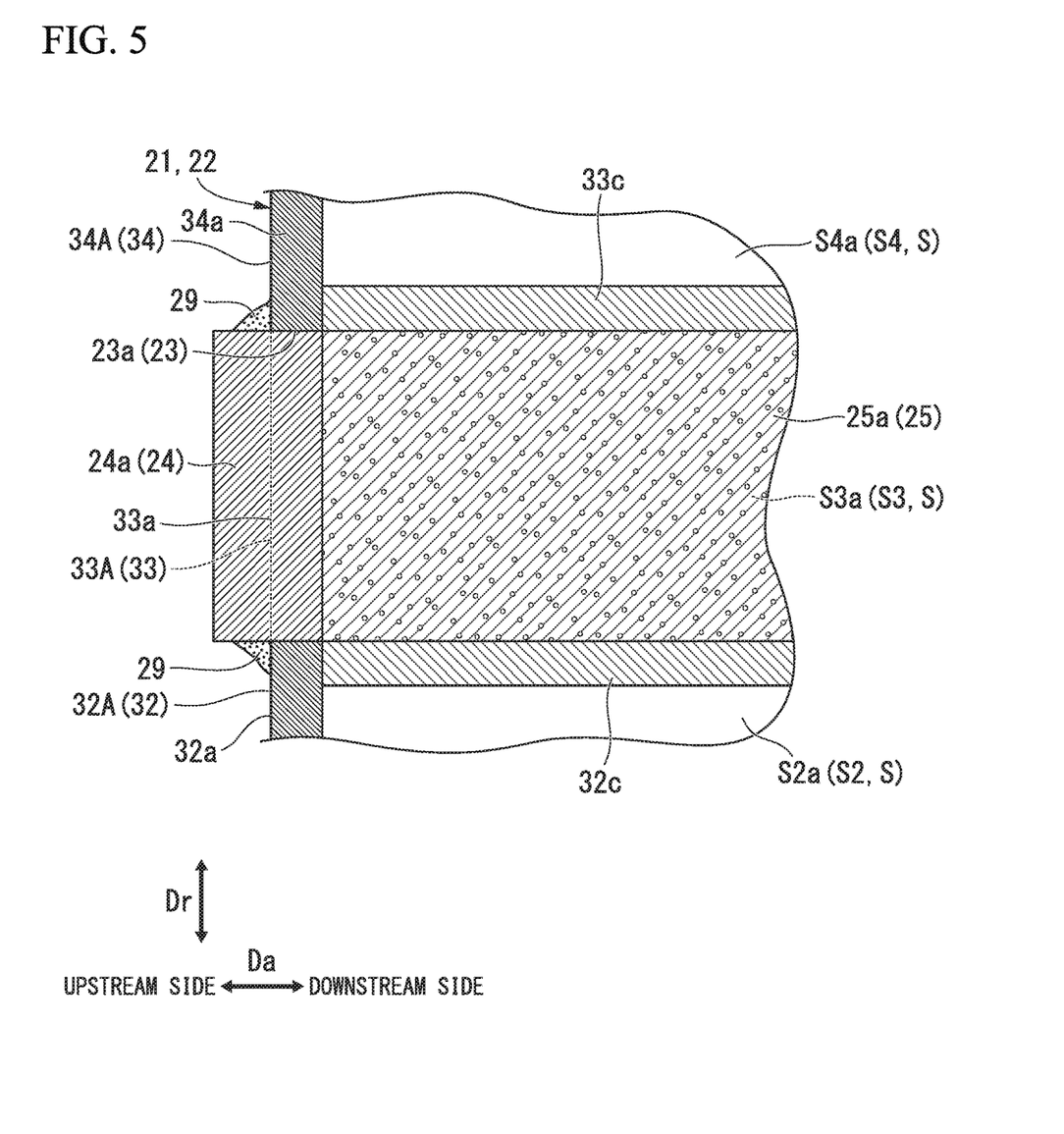
FIG. 5 is an enlarged view of a major part of FIG. 4.

As shown in FIGS. 4 to 6, an A discharge opening 23a configured to bring the outside in communication with the third A space S3a is formed in the upstream side plate 33a of the third A space-forming member 33A. The A discharge opening 23a has an opening area formed in a rectangular shape and having a larger size than an opening area of the drain hole (not shown) or the through-hole 14 of the combustion liner 12. A pair of sides that are opposite to each other in the A discharge opening 23a having a rectangular shape are opposite to each other in the radial direction Dr, and the other pair of sides that are opposite to each other are opposite to each other in the circumferential direction Dc. An interval of the pair of sides that are opposite to each other in the radial direction Dr is substantially equal to an interval between the cylinder-opposing plate 32c of the second A space-forming member 32A and the cylinder-opposing plate 33c of the third A space-forming member 33A. That is, the A discharge opening 23a formed in the upstream side plate 33a is substantially opened from the one cylinder-opposing plate 32c to the other cylinder-opposing plate 33c of the cylinder-opposing plate 32c of the second A space-forming member 32A and the cylinder-opposing plate 33c of the third A space-forming member 33A that are opposite to each other. The A discharge opening 23a is closed by an A lid 24a corresponding to a shape and a size of the A discharge opening 23a. The A lid 24a is joined to a portion of the space-forming member 21 around the A discharge opening 23a by welding.

The A porous body 25a is joined to the A lid 24a by brazing or the like. As shown in FIG. 6, the A porous body 25a is formed in a rectangular parallelepiped shape. The A lid 24a is joined to one surface 26a of a pair of surfaces 26a and 26b of the A porous body 25a having the rectangular parallelepiped shape by brazing or the like. A shape and a size of the one surface 26a correspond to a shape and a size of a surface of the A lid 24a to which the A porous body 25a is joined. The other surface 26b of the pair of surfaces 26a and 26b of the A porous body 25a comes in contact with the downstream side plate 33b of the third A space-forming member 33A or is adjacent to the downstream side plate 33b. One surface 26c of another pair of surfaces 26c and 26d of the A porous body 25a having the rectangular parallelepiped shape comes in contact with the cylinder-opposing plate 32c of the second A space-forming member 32A or is adjacent to the cylinder-opposing plate 32c. In addition, of the other pair of surfaces 26c and 26d, the other surface 26d comes in contact with the cylinder-opposing plate 33c of the third A space-forming member 33A or is adjacent to the cylinder-opposing plate 33c.

As shown in FIGS. 7 and 8, a B discharge opening 23b configured to bring the outside in communication with the fourth B space S4b is formed in the cylinder-opposing plate 34c of the fourth B space-forming member 34B. The B discharge opening 23b is also an opening area formed in a rectangular shape and having a larger size than the opening area of the drain hole (not shown) or the through-hole 14 of the combustion liner 12. A pair of sides that are opposite to each other in the B discharge opening 23b having the rectangular shape are opposite to each other in the axial direction Da, and the other pair of sides that are opposite to each other are opposite to each other in the circumferential direction Dc. An interval of the pair of sides that are opposite to each other in the axial direction Da is substantially equal to an interval between the upstream side plate 34a and the downstream side plate 34b of the fourth B space-forming member 34B. That is, the B discharge opening 23b formed in the cylinder-opposing plate 34c is substantially opened from the upstream side plate 34a to the downstream side plate 34b of the upstream side plate 34a and the downstream side plate 34b that are opposite to each other. The B discharge opening 23b is closed by a B lid 24b corresponding to a shape and a size of the B discharge opening 23b. The B lid 24b is joined to a portion of the fourth B space-forming member 34B around the B discharge opening 23b by welding.

The B porous body 25b is joined to the B lid 24b by brazing or the like. As shown in FIG. 8, the B porous body 25b is formed in a rectangular parallelepiped shape. The B lid 24b is joined to one surface 27a of a pair of surfaces 27a and 27b of the B porous body 25b having the rectangular parallelepiped shape by brazing or the like. A shape and a size of the one surface 27a correspond to a shape and a size of a surface of the B lid 24b to which the B porous body 25b is joined. The other surface 27b of the pair of surfaces 27a and 27b of the B porous body 25b comes in contact with the cylinder-opposing plate 33c of the third B space-forming member 33B or is adjacent to the cylinder-opposing plate 33c. Of another pair of surfaces 27c and 27d of the B porous body 25b having the rectangular parallelepiped shape, the one surface 27c comes in contact with the upstream side plate 34a of the fourth B space-forming member 34B or is adjacent to the upstream side plate 34a. In addition, of the other pair of surfaces 27c and 27d, the other surface 27d comes in contact with the downstream side plate 34b of the fourth B space-forming member 34B or is adjacent to the downstream side plate 34b.

Next, an operation and an action of the gas turbine of the embodiment will be described.

The compressor 1 suctions and compresses external air. The air compressed by the compressor 1 is guided to the fuel supply device 15 of the combustor 10. Fuel from a fuel supply source is supplied into the fuel supply device 15. The fuel from the fuel supply device 15 is sprayed into the combustion liner 12 together with the compressed air and combusted in the combustion liner 12. A combustion gas generated by combustion and having a high temperature and a high pressure is guided into the gas flow path of the turbine 5 from the combustion liner 12 to rotate the turbine rotor 6.

When the fuel is combusted in the combustion liner 12, combustion oscillations may be generated by the combustion. In particular, when the fuel is lean-combusted in order to decrease NOx contained in the exhaust gas from the gas turbine, the combustion becomes unstable, and the combustion oscillations can easily occur.

In the embodiment, oscillations of the air generated by combustion of the fuel in the combustion liner 12, such as combustion oscillation, i.e., sound, is suppressed by the sound attenuator 20 installed at the outer peripheral side of the combustion liner 12. At least a portion of the space-forming member 21 of the sound attenuator 20 constitutes a Helmholtz resonance box, and at least a portion of the space S formed by the space-forming member 21 forms a resonance space. Accordingly, in the combustor 10 of the embodiment, as described above, the sound generated in the combustion liner 12 can be suppressed. Moreover, in the embodiment, since the porous body 25 is disposed in the space S formed by the space-forming member 21, in a process in which the sound generated in the combustion liner 12 passes through the porous body 25 in the space S, oscillation energy thereof is absorbed, i.e., the sound is reduced.

Figure 9:
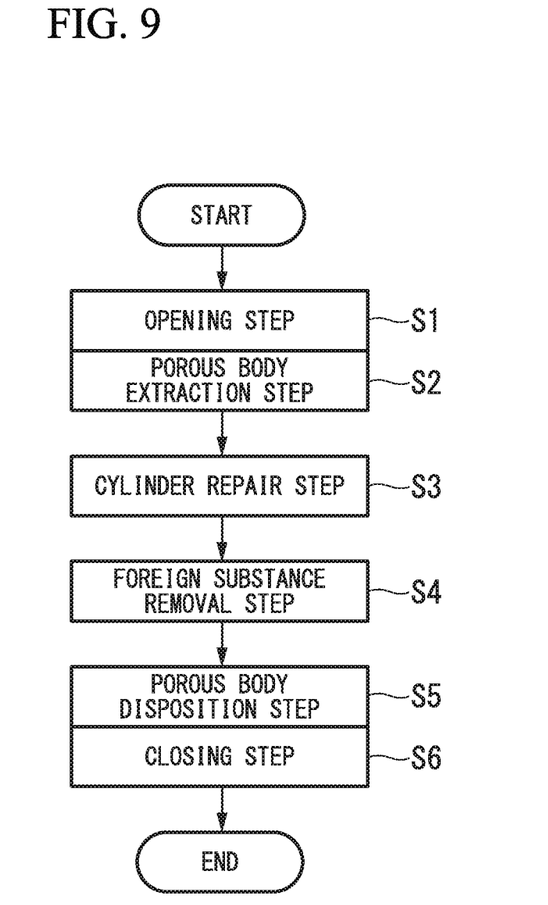
FIG. 9 is a flowchart showing a procedure of a method of repairing a combustor according to an embodiment of the present invention.

Next, a method of repairing the combustor 10 will be described with reference to a flowchart shown in FIG. 9.

The gas turbine includes a member exposed to the high temperature combustion gas, a rotating member, and so on. For this reason, the gas turbine is periodically inspected. In the inspection process, when a member that is damaged or deteriorated is found, the member is exchanged or repaired. Since the combustor 10 of the gas turbine includes a member exposed to the high temperature combustion gas, the combustor 10 is repaired according to necessity.

Since the thermal barrier coating applied on the inner peripheral side of the combustion liner 12 is exposed to the high temperature combustion gas, the thermal barrier coating deteriorates or is damaged. For this reason, in repair of the combustor 10 according to the embodiment, after the thermal barrier coating that has deteriorated or been damaged is delaminated, the thermal barrier coating is applied to the inner peripheral side of the combustion liner 12 again (S3: cylinder repair step).

Figure 10:
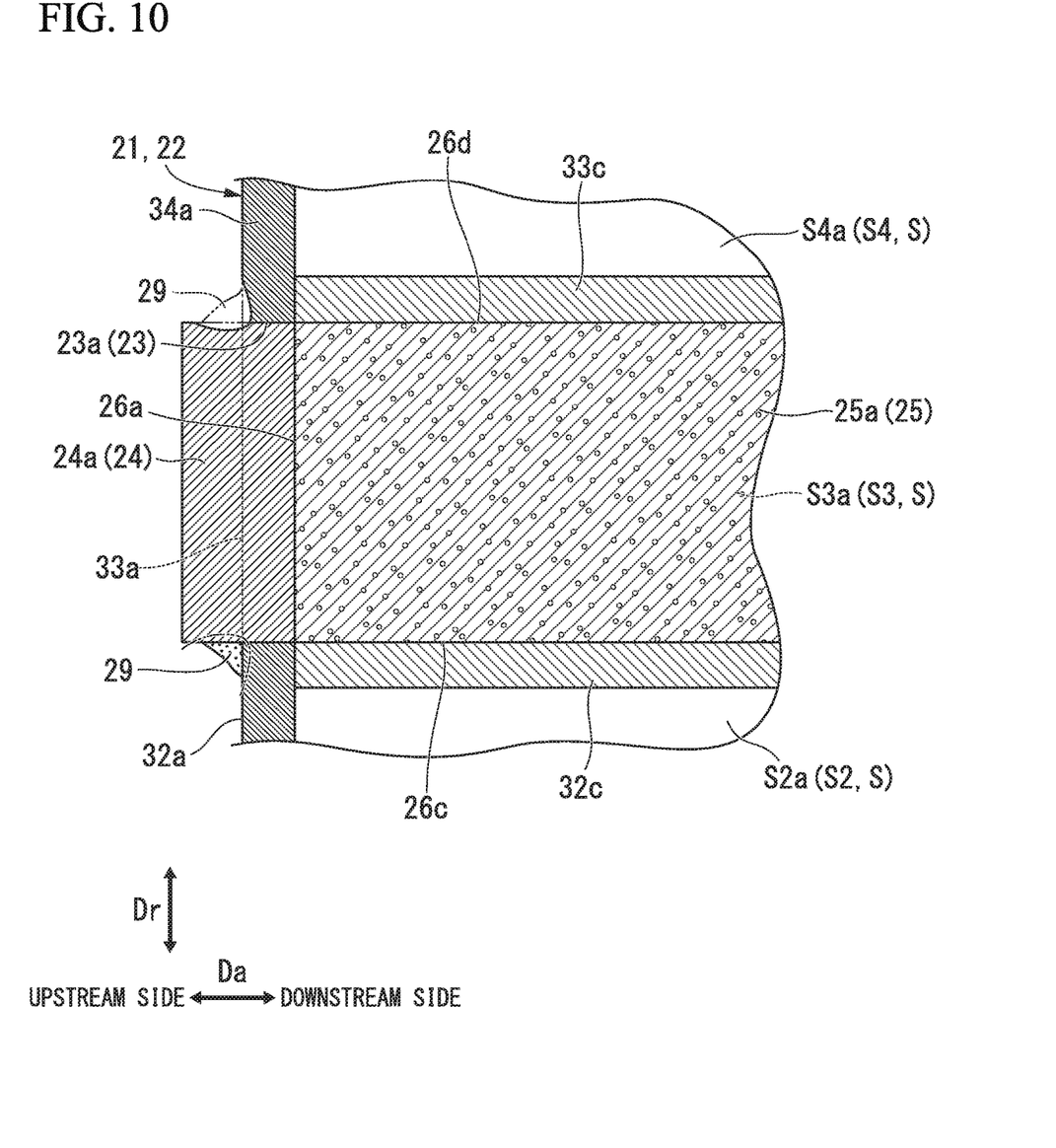
FIG. 10 is an enlarged cross-sectional view of a major part of the sound attenuator in an opening step according to the embodiment of the present invention.

In the embodiment, after the combustion liner 12 is removed from the fuel supply device 15 before the cylinder repair step S3, the discharge opening 23 is formed at a portion in contact with the outside in the space-forming member 21 installed at the outer peripheral side of the combustion liner 12 (S1: opening step). In the opening step S1, as shown in FIG. 10, a welded portion 29 that joins the main body 22 and the lid 24 of the space-forming member 21 is removed by a grinder or the like, and the main body 22 and the lid 24 are separated from each other. As a result, the discharge opening 23 formed in the main body 22 is opened. In the process of separating the lid 24 from the main body 22, the porous body 25 joined to the lid 24 is extracted to the outside from inside the space-forming member 21 via the discharge opening 23 (S2: porous body extraction step). Specifically, as shown in FIG. 6, as the A lid 24a that closes the A discharge opening 23a formed in the upstream side plate 33a of the third A space-forming member 33A is moved upstream in the axial direction Da, the A porous body 25a joined to the A lid 24a is extracted to the outside from the third A space S3a via the A discharge opening 23a. In addition, as shown in FIG. 8, as the B lid 24b that closes the B discharge opening 23b formed in the cylinder-opposing plate 34c of the fourth B space-forming member 34B is moved to the outside in the radial direction Dr, the B porous body 25b joined to the B lid 24b is extracted to the outside from the fourth B space S4b via the B discharge opening 23b.

Next, the above-mentioned cylinder repair step S3 is performed. In the cylinder repair step S3, first, blast treatment is performed on the inner peripheral surface of the combustion liner 12 to which the thermal barrier coating is applied. In the blast treatment, ceramic or metal particles such as alumina particles collide with the inner peripheral surface of the combustion liner 12 and delaminate the thermal barrier coating. Next, as the metal powder or the ceramic powder having high thermal resistance is sprayed on the inner peripheral surface of the combustion liner 12 from which the thermal barrier coating is removed, the thermal barrier coating is formed on the inner peripheral surface again.

In the process of delaminating the thermal barrier coating, particles of a metal, ceramic, or the like, that form the thermal barrier coating, and particles of blasting metal or the like enter the space S formed by the space-forming member 21 via the large number of through-holes 14 of the combustion liner 12. In addition, even in the process of applying the thermal barrier coating, particles of the metal, ceramic, or the like, that form the thermal barrier coating enter the space S formed in the space-forming member 21 via the large number of through-holes 14 of the combustion liner 12. Further, even in an operation of the combustor 10, various kinds of foreign substances enter the space S formed in the space-forming member 21 via the large number of through-holes 14 of the combustion liner 12.

Figure 11:
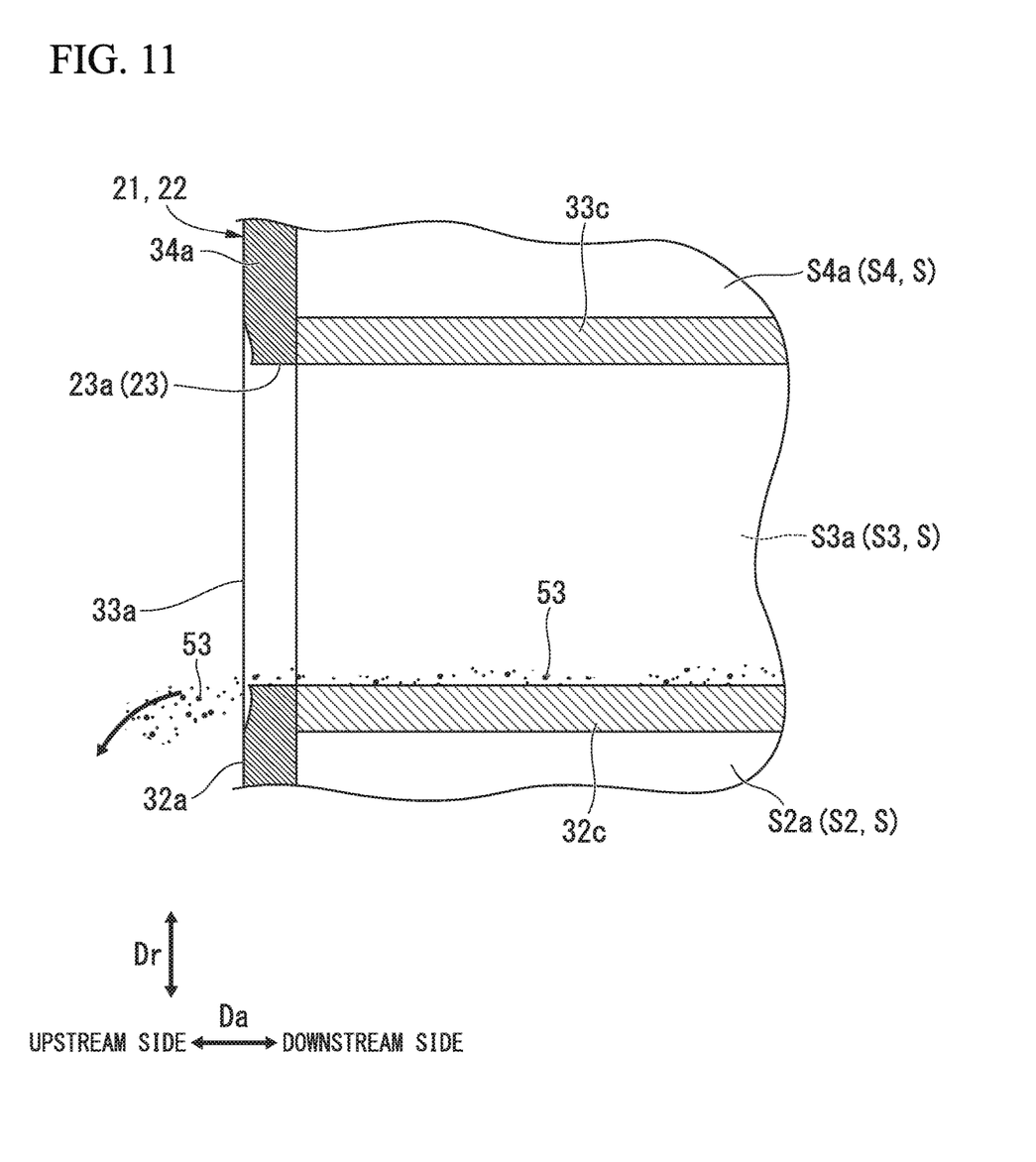
FIG. 11 is an enlarged cross-sectional view of the major part of the sound attenuator in a foreign substance removal step according to the embodiment of the present invention.

Next, the various kinds of foreign substances that have entered the space S are removed from the space S formed in the space-forming member 21 (S4: foreign substance removal step). In the foreign substance removal step S4, as shown in FIG. 11, various kinds of foreign substances 53 in the space S are discharged to the outside from the discharge opening 23 formed in the space-forming member 21 of the sound attenuator 20 by integrally shaking the combustion liner 12 and the sound attenuator 20 installed at the combustion liner 12 or by blowing off with air.

Next, the porous body 25 to which the lid 24 is joined is inserted into the space S from the discharge opening 23 formed in the space-forming member 21 (S5: porous body disposition step), simultaneously, the discharge opening 23 is closed by the lid 24, and the lid 24 is joined to the main body 22 of the space-forming member 21 by welding or the like (S6: closing step). Further, the porous body 25 to which the lid 24 is joined may be that obtained in the above-described porous body extraction step S2 or may be a new one.

Next, the combustor 10 is completed by assembling parts that constitute the combustor 10, for example, attaching the combustion liner 12 to the fuel supply device 15, or the like. Thus ends repair of the combustor 10.

As described above, in the embodiment, the foreign substances can be easily removed from the inside of the space-forming member 21 of the sound attenuator 20, and a time consumed for repairing the combustor 10 can be reduced.

In addition, in the embodiment, before the cylinder repair step S3, since the porous body 25 in the space S is extracted from the discharge opening 23 to the outside, the foreign substances such as a metal powder generated due to execution of the cylinder repair step S3 can be prevented from being attached to the porous body 25. In addition, as the porous body 25 is extracted from the space S, movement of the foreign substances in the space S becomes easy, and the foreign substances in the space S can be more easily removed to the outside. Moreover, in the embodiment, since the porous body 25 is joined to the lid 24, in the opening step S1, when the main body 22 and the lid 24 are separated, the porous body 25 in the space S can be easily extracted from the discharge opening 23 to the outside. In addition, in the embodiment, since the porous body 25 joined to the lid 24 is disposed in the space S as the discharge opening 23 is closed by the lid 24, the porous body 25 can be easily disposed in the space S.

Further, the space-forming member 21 of the above-described embodiment has the plurality of spaces formed at the outer peripheral side of the combustion liner 12 toward the outside in the radial direction Dr. However, the space-forming member 21 may form the plurality of spaces at the outer peripheral side of the combustor 10 in the axial direction Da, or the space-forming member 21 may form the plurality of spaces at the outer peripheral side of the combustion liner 12 toward the outside in the radial direction Dr, and further divide some or each of the plurality of spaces in the axial direction Da.

In addition, while the sound attenuator 20 of the above-described embodiment has the space-forming member 21 and the porous body 25, the porous body 25 may be omitted.

INDUSTRIAL APPLICABILITY

According to an aspect of the present invention, the foreign substances can be easily removed from the inside of the sound attenuator of the combustor.

REFERENCE SIGNS LIST 1 compressor
5 turbine
10 combustor
12 combustion liner
14 through-hole
20 sound attenuator
21 space-forming member
22 main body
23 discharge opening
23a A discharge opening
23b B discharge opening
24 lid
24a A lid
24b B lid
25 porous body
25a A porous body
25b B porous body
31 first space-forming member
32 second space-forming member
32A second A space-forming member
32B second B space-forming member
33 third space-forming member
33A third A space-forming member
33B third B space-forming member
34 fourth space-forming member
34A fourth A space-forming member
34B fourth B space-forming member
53 foreign substance

The invention claimed is:

1. A method of repairing a combustor, the combustor comprising a cylinder in which a combustion gas flows through an inner peripheral side and a plurality of holes are formed so as to pass from the inner peripheral side to an outer peripheral side, and a sound attenuator having a space-forming member configured to form a space at the outer peripheral side of the cylinder so as to constitute a Helmholtz resonance box, wherein the space is connected to the plurality of holes, and the sound attenuator is joined to an outer peripheral surface of the cylinder, the method of repairing the combustor comprising:
   an opening step of opening a portion of the space-forming member in contact with an outside and bringing the outside and the space in communication with each other;
   a cylinder repair step of repairing the cylinder;
   a foreign substance removal step of removing foreign substances in the space from an opening opened in the opening step to the outside, after the cylinder repair step; and
   a closing step of closing the opening using a lid, after the foreign substance removal step.

2. The method of repairing the combustor according to claim 1, wherein, in the opening step, the portion of the space-forming member in contact with the outside is opened so as to have an opening area larger than an opening area of each of the plurality of holes.

3. The method of repairing the combustor according to claim 1, wherein the space-forming member has a pair of first plates opposite to each other at an interval, and a second plate configured to connect ends of the pair of first plates to each other, and
   in the opening step, the second plate is opened from one first plate of the pair of first plates to the other first plate.

4. The method of repairing the combustor according to claim 1, wherein the sound attenuator has a porous body disposed in the space,
   the method of repairing the combustor further comprising:
   a porous body extraction step of extracting the porous body in the space from the opening opened in the opening step to the outside, before the cylinder repair step; and
   a porous body disposition step of inserting the porous body into the space from the opening before the opening is closed in the closing step, after the foreign substance removal step.

5. The method of repairing the combustor according to claim 1, wherein the space-forming member has a main body having an opening configured to bring the outside and the space in communication with each other, and the lid is joined to the main body and configured to close the opening, and
   in the opening step, the main body and the lid are separated from each other.

6. The method of repairing the combustor according to claim 1, wherein the space-forming member has a main body having an opening configured to bring the outside and the space in communication with each other, and the lid is joined to the main body and configured to close the opening,
   the sound attenuator has a porous body disposed in the space and joined to the lid,
   in the opening step, the main body and the lid are separated from each other, the lid is distanced from the main body, and the porous body in the space is extracted from the opening to the outside, and
   in the closing step, as the opening is closed by the lid, the porous body joined to the lid is disposed in the space.

* * * * *